(12) United States Patent
Winkelmann (10) Patent No.: US 11,483,962 B2
(45) Date of Patent: Nov. 1, 2022

(54) APPARATUS AND METHOD FOR SEPARATING OUT GRAINS OF SEED, FERTILIZER OR THE LIKE

(71) Applicant: Kverneland A/S, Klepp Stasjon (NO)

(72) Inventor: Michael Winkelmann, Soest (DE)

(73) Assignee: Kverneland A/S, Klepp Stasjon (NO)

( * ) Notice: Subject to any disclaimer, the term of this patent is extended or adjusted under 35 U.S.C. 154(b) by 276 days.

(21) Appl. No.: 16/759,053

(22) PCT Filed: Oct. 19, 2018

(86) PCT No.: PCT/EP2018/078677
§ 371 (c)(1),
(2) Date: Apr. 24, 2020

(87) PCT Pub. No.: WO2019/081360
PCT Pub. Date: May 2, 2019

(65) Prior Publication Data
US 2020/0367424 A1     Nov. 26, 2020

(30) Foreign Application Priority Data
Oct. 27, 2017   (EP) .................................. 17198983

(51) Int. Cl.
*A01C 7/04* (2006.01)
*A01C 7/08* (2006.01)
*A01C 15/06* (2006.01)

(52) U.S. Cl.
CPC .............. *A01C 7/046* (2013.01); *A01C 7/082* (2013.01); *A01C 15/06* (2013.01)

(58) Field of Classification Search
CPC ......... A01C 7/046; A01C 7/082; A01C 15/06; A01C 7/044; A01C 7/042; A01C 7/04;
(Continued)

(56) References Cited

U.S. PATENT DOCUMENTS 8,499,703 B2    8/2013  Downs
2006/0243179 A1  11/2006  Landphair et al.

FOREIGN PATENT DOCUMENTS

DE     102016204453 A1   9/2017
EP          2696667 B1   4/2015
(Continued)

OTHER PUBLICATIONS

European Search Report dated Jan. 3, 2019, co-pending European Patent Application No. PCT/EP2018/078677 filed Oct. 19, 2018.

*Primary Examiner* — Christopher J. Novosad
(74) *Attorney, Agent, or Firm* — Leason Ellis LLP (57) ABSTRACT

An apparatus for separating grains of seed or fertilizer includes a separating device having a housing with a housing base for mounting on an agricultural machine. A releasable housing cover is arranged on the housing base in a releasable manner. A grain sump receives the grains introduced into the housing interior to be separated out. A rotatable separating disc having openings is positioned in the housing interior. An overpressure region is formable in the housing cover on a front side of the separating disc during operation, such that a flow can form from the overpressure region through the openings to the rear side of the disc and grains separated can be localized near the openings. A grain transfer device includes a feed, a wall bushing and an outlet, wherein the separated grains can be introduced through the feed into the bushing and discharged from the housing interior through the bushing.

12 Claims, 6 Drawing Sheets

(58) Field of Classification Search
CPC .. A01C 7/00; A01C 7/081; A01C 7/08; A01C 15/00
See application file for complete search history.

(56) References Cited

FOREIGN PATENT DOCUMENTS

| | | |
|---|---|---|
| WO | 2008108732 A1 | 9/2008 |
| WO | 2010059101 A1 | 5/2010 |

APPARATUS AND METHOD FOR SEPARATING OUT GRAINS OF SEED, FERTILIZER OR THE LIKE

The invention relates to an apparatus and to a method for separating out grains of seed, fertilizer or the like.

BACKGROUND

Such apparatuses are used for separating out grains of seed, fertilizer or the like in order to then apply them individually. A separating device used for this purpose can be part of a seed meter.

In one design of such seed meters, separating devices operate according to the positive-pressure principle. In this case, a positive pressure is generated in a housing of the separating device on a front side of a seeding disk such that an airflow is generated to the rear side through openings in the seeding disk. Due to the pressure difference produced in the region of the openings, individual seeds are localized in the region of the openings. The grains separated out in this way can then be discharged from the housing after being released from the separating disk. An apparatus operating on the positive-pressure principle is disclosed in WO 2008/108732 A1, for example.

An agricultural machine having at least one drilling unit is known from WO 2010/059101 A. The drilling unit comprises a support device and a seed metering device and is movably connected to a structural element of the agricultural machine. The seed metering device is fixedly connected to the support device of the drilling unit and has a chamber for seed for the application of positive pressure, the seed metering element forming a wall which delimits the chamber and in which holes or recesses are arranged. The holes/recesses connect the chamber to the surrounding region so as to hold the seed at the holes or recesses of the seed metering element, and to transport the seed, using the resulting pressure difference. A seed metering line has an inlet in the chamber in order to generate an airflow for transporting the seed out of the chamber through the seed metering line and to a drill furrow using the positive pressure in the chamber.

DE 10 2016 204 453 A1 discloses a row unit of an agricultural machine for distributing granular distribution material such as seed and/or fertilizer. The row unit comprises at least one coulter frame carrying the components of the row unit, a metering device for individually discharging distribution material and having a housing and a metering disk rotating therein, a seed flow sensor which determines the quality of the separating-out, a seed tube transporting the separated-out distribution material to a seed furrow, in which seed tube an airflow volume generated by the metering device prevails, furrow-opening tools, in particular in the form of two coulter disks arranged at an angle to one another, the seed tube being arranged between and/or next to these, a depth guide wheel which is arranged next to the at least one furrow-opening tool and defines the working depth, and pressure roll which closes the seed furrow. In order to achieve an adjustment of an airflow volume in a seed tube with simple means, the metering device has a housing which is substantially composed of a lid and a grain feeder, as well as a grain discharge, the grain discharge being changeable according to the grain size of the distribution material and having a seed tube portion.

EP 2 696 667 A1 describes a metering device for an agricultural planting device. The metering device has a metering chamber with a dispensing region for seed, and a metering disk which can be rotated in the metering chamber. The metering disk has a plurality of seed pockets for conveying or carrying seed on or with the metering disk, the seed pockets being arranged at mutually spaced locations around the metering disk. The metering disk also has a magnetic drive ring on the outer circumference of the metering disk. The metering device has a stator which is arranged adjacently to the metering disk. The stator interacts with the magnetic drive ring to rotate the metering disk in the metering chamber, such that the seed pockets move successively near the discharge region during the rotation of the metering disk.

SUMMARY

The object of the invention is to provide an apparatus and a method for separating out the grains of seed, fertilizer or the like, which support a flexible and efficient operation.

In order to achieve this object, an apparatus and a method for separating out grains of seed, fertilizer or the like according to independent claims 1 and 14 are provided. Furthermore, a seed meter and a seeding row are provided according to claims 12 and 13. Embodiments are subject of dependent claims.

According to one aspect, an apparatus for separating out grains of seed, fertilizer or the like is provided, which apparatus has a separating device that operates according to the positive-pressure principle. The separating device has a housing which has a housing base to be mounted on a frame or on a seeding row of an agricultural machine and has a housing cover which is detachably or removably arranged on the housing base for opening and closing a housing interior. A grain sump is provided in the housing for receiving grains of seed, fertilizer or the like which are introduced into the housing interior and are to be separated out. A separating disk is rotatably mounted in the interior of the housing and has an arrangement of openings. During operation, a positive-pressure region can be formed in the housing cover on a front side of the separating disk, such that a flow can be formed from the positive pressure region through the openings to the rear side of the separating disk, and separated-out grains can thus be localized in the region of the openings or adjacent thereto. The separating device has a grain transfer device which is formed having a feed, a wall feedthrough, and an outlet on the housing cover, wherein the separated-out grains, after release from the separating disk, can be introduced through the feed in the wall feedthrough, and can be conveyed through said feed out of the housing interior via the outlet.

According to a further aspect, a method for separating out grains of seed, fertilizer or the like is provided by means of a separating device that operates according to the positive-pressure principle, the method comprising the following: a housing is provided, having a house base to be mounted on a frame or on a seeding row of an agricultural machine, and having a housing cover which is detachably arranged on the housing base for opening and closing a housing interior; a grain sump receives grains of seed, fertilizer or the like which are introduced into the housing interior and are to be separated out; a separating disk which is arranged in the housing interior and has an arrangement of openings is rotated; a positive-pressure region is formed in the housing cover on a front side of the rotating separating disk such that a flow forms from the positive-pressure region through the openings toward the rear side of the separating disk and separated-out grains can thus be localized in the region of the openings or adjacent thereto; and the separated-out grains, after release from the separating disk, move to a grain transfer device, the grain transfer device having a feed, a wall feedthrough, and an outlet on the housing cover, such that the separated-out grains, after release from the separating disk, are introduced through the feed in the wall feedthrough and are conveyed through said feed out of the interior of the housing via the outlet.

Furthermore, a seed meter and a seeding row are provided, each having an apparatus for separating out grains of seed, fertilizer or the like.

A motor can be arranged on the housing of the separating device, for example on the housing base, which motor provides a drive movement for rotating the separating disk. The motor can be arranged on the housing base, for example on a rear side of the housing.

A feed is provided on the housing, through which feed the grains to be separated out can be introduced into the housing interior. The feed is connected for example via a tube connection to a container or tank in which the seed, the fertilizer or the like is provided.

The positive-pressure region can be formed in such a way that a flow can be formed through the wall feedthrough of the grain transfer device in order to accelerate the separated-out grains in addition to their movement caused by gravity. In order to form a positive pressure in the housing, including the positive-pressure region on the front side of the separating disk, a gaseous fluid, for example air, is introduced into the housing via a fluid feed. The fluid feed can be formed on the housing cover. To provide the gaseous fluid flow, a blower can be provided, which can be accommodated, for example, on a frame component of the agricultural machine.

The grain transfer device can be integrally molded on the housing cover. The integral molding can be achieved, for example, by the housing cover being provided as an injection molded component.

A grain receptacle can be arranged in the region of the feed, which grain receptacle defines a feed opening for grain entry connected to the wall feedthrough and is detachably arranged on the inside of the housing cover. The grain receptacle can be attached to or inserted into the feed, in particular by means of a coupling portion formed on the grain receptable. The grain receptable can be arranged on an inside of a wall portion of the housing cover. A set of different interchangeable grain receptacles can be provided by means of which the feed opening for the grain entry can be adapted to different types of grains, for example in that the different grain receptacles provide different diameters of the feed opening. The grain receptacle is configured to receive (catch) the separated-out grain after release from the separating disk, in order to then lead it out through the wall feedthrough, out of the housing interior, and to the exterior.

A grain scraper can be arranged in the region of the feed of the grain transfer device. The release of the separated-out grains from the separating disk can be assisted by the grain scraper. As such, in one embodiment, the grains can be separated from the openings of the separating disk by temporally limiting, eliminating or removing the pressure difference which arises at the assigned opening due to the flow from the front side to the rear side of the separating disk, whereupon the grain is released. If this release process does not work correctly, the grain can be forcibly released with the grain scraper in order to be brought to the grain transfer device.

The grain scraper can be detachably arranged on the grain receptable. As a result, different grain scrapers can be used on the grain receptable, allowing adaptation to different types of grains. A set of different grain scrapers can be provided, each of which is adapted to different types of grain, for example by virtue of each having a different design, for example with regard to the outer shape and/or the size of the grain scraper.

A coupling device which is configured to detachably couple a grain guide tube can be arranged at the outlet of the grain transfer device. The grain guide tube can be detachably connectable directly or via an intermediate coupled component. In one embodiment, a sensor component, for example an optical sensor, by means of which the separated-out grains flying past can be detected can be coupled to the coupling device of the outlet. The coupling device can have a quick-release fastener. The grain guide tube can be formed having a grain guide tube bend which has a straight tube portion and a curved tube portion adjoining it. The straight tube portion can be coupled to the grain transfer device. The grain can be discharged from the grain guide tube at the end of the curved tube portion. In addition to separating out the grains, the apparatus is then additionally configured by means of the grain guide tube to discharge the separated-out grains, particularly via the grain guide tube. If the separating apparatus is integrated into a seed meter, the grain guide tube can be coupled to the seed meter.

The coupling device can be formed on a coupling component inserted through the outlet in the wall feedthrough. The coupling component inserted into the wall feedthrough can be detachably or exchangeably accommodated therein.

The grain guide tube can be detachably arranged on a support component. The support component can extend along the grain guide tube over its entire length or only a part thereof. The support component can be designed as a flat component. A dovetail attachment can be provided for releasably arranging the grain guide tube on the support tube part. If the grain guide tube has a grain guide tube bend, the support component can extend over the straight tube portion and the curved tube portion.

The grain guide tube can have a substantially round tube cross-section in a tube portion that is proximal with respect to the grain transfer device and a substantially oval tube cross-section in a tube portion that is distal with respect to the grain transfer device. The substantially oval tube cross-section can be arranged in the curved tube portion if the grain guide tube is formed having the grain guide tube bend. In the region of an outlet opening of the grain guide tube through which the separated-out grains are discharged, the oval tube cross-section can be upright.

In the housing interior, an inner wall portion can be arranged in the housing cover, which inner wall portion shields a grain transfer chamber upstream of the grain transfer device from the rest of the housing interior in the housing cover, the inner wall portion having a passage which is connected to a fluid feed of the housing such that a counterflow can be formed during operation by feeding a gaseous fluid through the passage in an opening via which the grain transfer chamber and the grain sump are connected, said counterflow counteracting the passage of grains out of the grain sump into the grain transfer chamber through the opening. By means of the inner wall portion, the grain transfer chamber is separated from the rest of the housing interior in the housing cover. The passage in the inner wall portion is connected to the feed of the gaseous fluid, in particular air, such that the introduced fluid flows through the passage into the grain transfer chamber. This produces the counterflow in the opening via which the grain transfer chamber and the grain sump are connected, as a result of which unintentional passage of grains from the grain sump into the grain transfer chamber is hindered or completely prevented. This configuration prevents grains from the grain sump entering the grain transfer device in an uncontrolled manner, without the separating-out process having been carried out for these grains. The passage in the inner wall portion can be surrounded solely by parts of the inner wall portion. Alternatively, the passage can be surrounded by parts of the inner wall portion and a wall of the housing cover. The opening between the grain transfer chamber and the grain sump can be formed as a further passage in the inner wall portion or as a lateral recess in the inner wall portion. Apart from the passage and the opening, the inner wall portion can be designed as a continuous, closed wall.

Regardless of the various embodiments, the gaseous fluid feed in the housing interior can be implemented by a sieve component in the housing cover, which sieve component is designed, for example, as a sheet metal component.

The separating disk can be arranged in the housing cover in a rotatably mounted plate. The plate and separating disk can be moved together during operation, such that there is no relative movement between the plate and the separating disk accommodated therein. The separating disk can be arranged in a receptacle of the plate with a positive connection around its outer edge. In one possible embodiment, an interrupter can be arranged on the rear side of the separating disk that faces the plate, which interrupter is configured to temporarily remove the pressure differences that occur in the region of the openings of the separating disk in order to localize the seeds, so as to assist release of the grains from the separating disk. The interrupter can be arranged on the rear side of the separating disk between the plate and the separating disk, for example so as to be stationary, such that when the plate and separating disk are rotated, a relative movement occurs between the interrupter and the separating disk, the interrupter sweeping over the openings from the back and thus temporarily removing the pressure difference or balancing the pressure for each opening. The interrupter can be designed as a flat component having, for example, a round or angular surface shape, for example made of a rubber or plastics material.

During operation, a positive pressure of at least approximately 50 mbar, for example between approximately 60 and approximately 75 mbar, can be formed in the housing of the separating device, alternatively with a positive pressure of approximately 60 to approximately 65 mbar.

In the context of the method for separating out grains of seed, fertilizer or the like, the configurations explained above in connection with the device can be provided accordingly.

DESCRIPTION OF EMBODIMENTS

Further embodiments are explained below with reference to figures of a drawing. In the figures:

FIG. 1 is a schematic perspective illustration of a separating apparatus for separating out grains of seed, fertilizer or the like;

Figure 1:
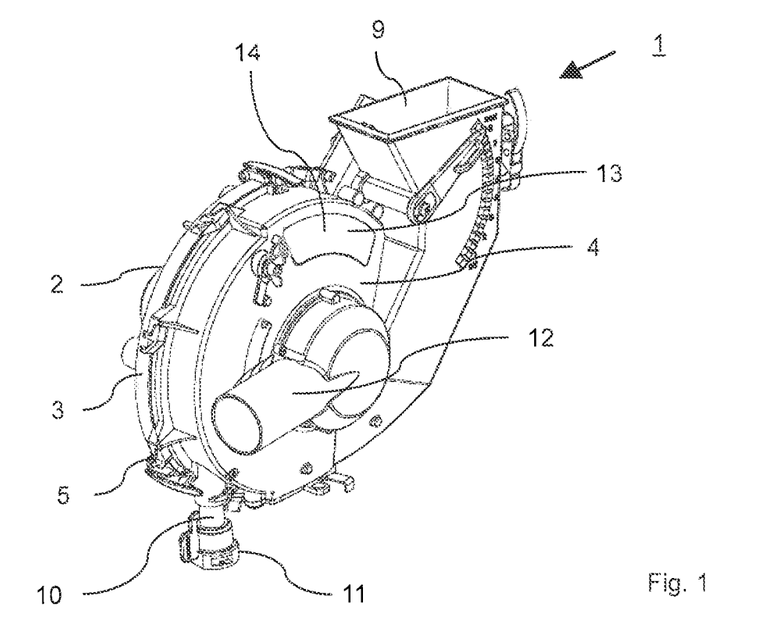

FIG. 1 is a schematic perspective illustration of a separating device 1 for separating out grains, seed, fertilizer or the like. The separating device 1 is formed having a housing 2 which has a housing base 3 and a housing cover 4, which housing cover is detachably arranged on the housing base 3 for opening and closing the housing 2 by means of a closure device 5.

Figure 2:
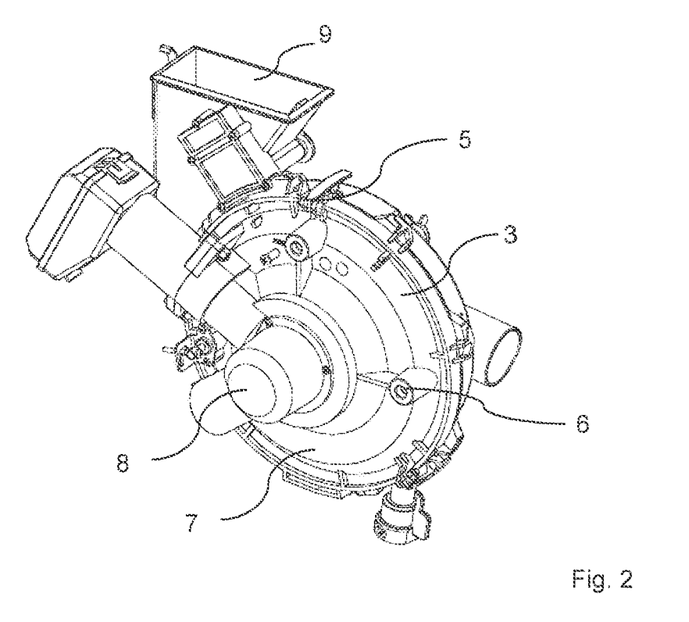
FIG. 2 is a schematic illustration of a housing base of the separating device from FIG. 1 in a rear view.

According to FIG. 2, the housing base 3 has a fastening device 6 by means of which the housing 2 is mounted on a frame (not shown) of an agricultural machine, for example on a seeding row. A drive device 8, which has an electric motor, is arranged on a rear side 7 of the housing base 3.

The grains to be separated out are introduced into the housing 2 via a grain feed 9. After separating out, the separated-out grains leave the housing 2 via a grain transfer device 10 and then enter a grain guide tube (not shown), which can also be referred to as a seed tube. The grain guide tube can be detachably arranged on the grain transfer device 10 by means of a quick-release fastener 11. The quick-release fastener 11 can be inserted into the grain transfer device 10 on the grain transfer device 10 by means of an insert component.

A gaseous fluid, in particular air, can be introduced into the housing 2 via a fluid connection 12 in order to generate a positive pressure in the housing 2 or only parts thereof. The positive pressure then leads to the separated-out grains being accelerated via the grain transfer device 10 into the coupled grain guide tube by means of a fluid flow.

Figure 3:
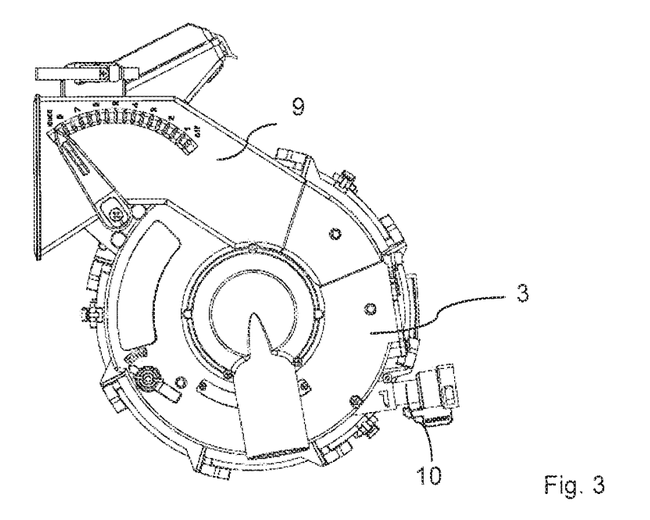
FIG. 3 is a schematic illustration of the separating device from FIG. 1 from the front.
Figure 4:
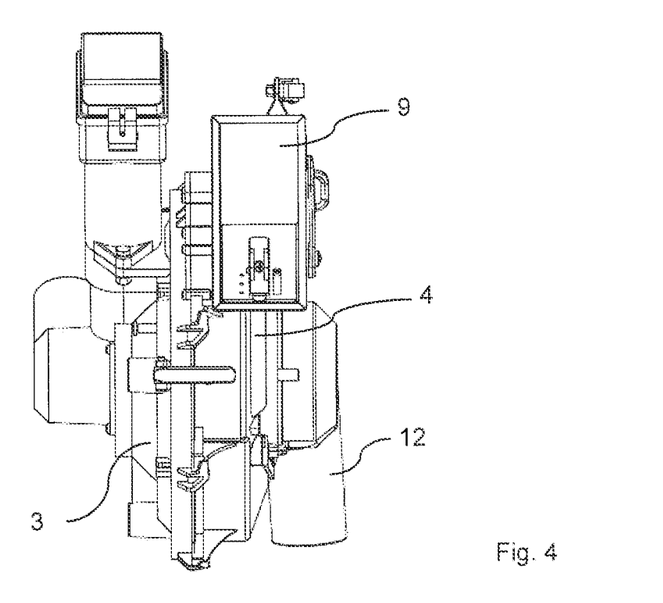
FIG. 4 is a schematic illustration of the separating device from FIG. 1 from the side.

A viewing window 13 is provided on the housing cover 4, through which window a housing interior 14 can be partially seen. FIGS. 3 and 4 show the separating device 1 from FIG. 1 from the front and the side.

FIGS. 5 to 8 are schematic illustrations of the housing cover 4. Opposite a feed 15 of the grain transfer device 10, there is a grain transfer chamber 16 which is separated or shielded from other parts of the housing interior 14 in the housing cover 4 by means of a housing inner wall portion 17. An opening 18 in the housing inner wall portion 17 connects the grain transfer chamber 16 to a grain sump 19 in the housing cover 4, in which sump the grains to be separated out first collect after being introduced.

The grains are separated out by means of a seeding disk or separating disk (not shown), which is rotatably mounted in the housing base 3 and is rotated during operation by means of the drive device 8. The seeding disk has passages through which an airflow passes to the rear side of the seeding disk due to positive pressure on a front side of the seeding disk, in particular in the region of the housing cover 4, as a result of which, due to a pressure difference caused thereby, separated-out grains are localized opposite and/or at the passages in the seeding disk. The localized grains are brought into the region of the grain transfer chamber 16 in this way in order to be released from the sowing wheel or separating disk there, so that they pass through the feed 15 into a wall feedthrough 20 of the grain transfer device 10.

After passing through the wall feedthrough 20 of the grain transfer device 10, the separated-out grains pass through an outlet 21 into the grain guide tube (not shown). In this way, the separating device 1 operates according to the positive-pressure principle. A positive-pressure region is provided on the front side of the seeding disk, which region produces a flow of the gaseous fluid through the passages of the seeding disk to its rear side.

When the gaseous fluid is introduced into the housing 2, it passes, in the embodiment shown, through a sieve component 22, for example a sheet metal sieve.

Figure 5:
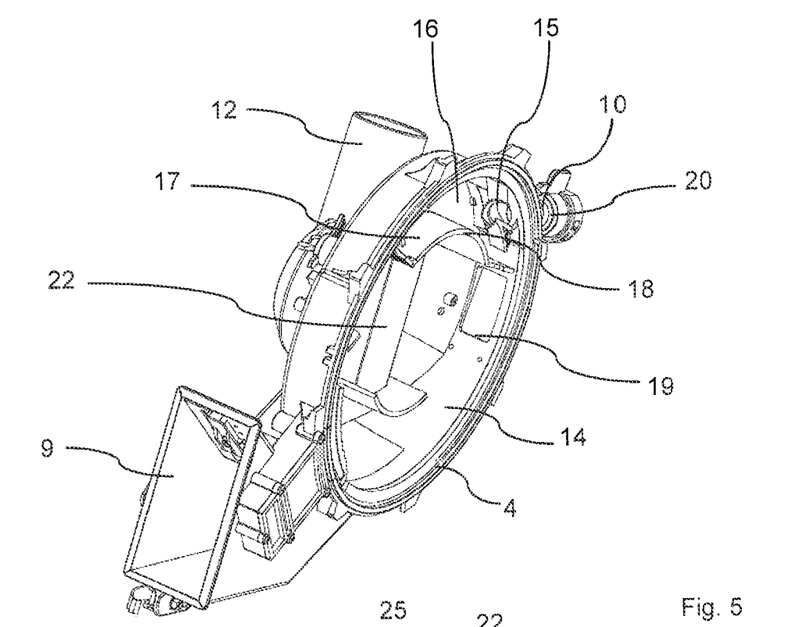
FIG. 5 is a schematic perspective illustration of a housing cover.
Figure 6:
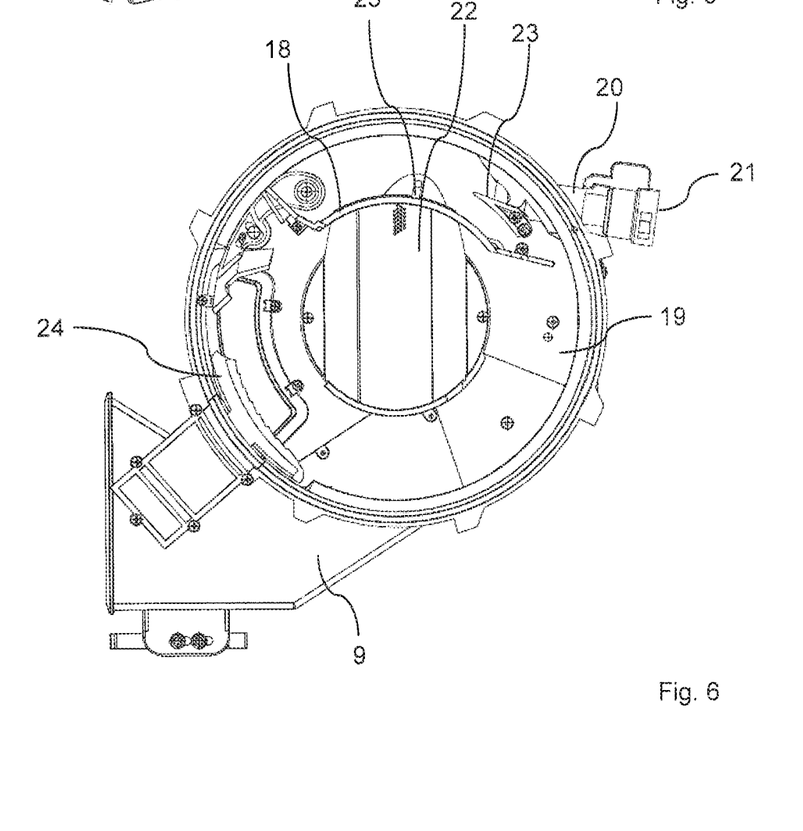
FIG. 6 is a schematic illustration of the housing cover from FIG. 5 from the front.
Figure 7:
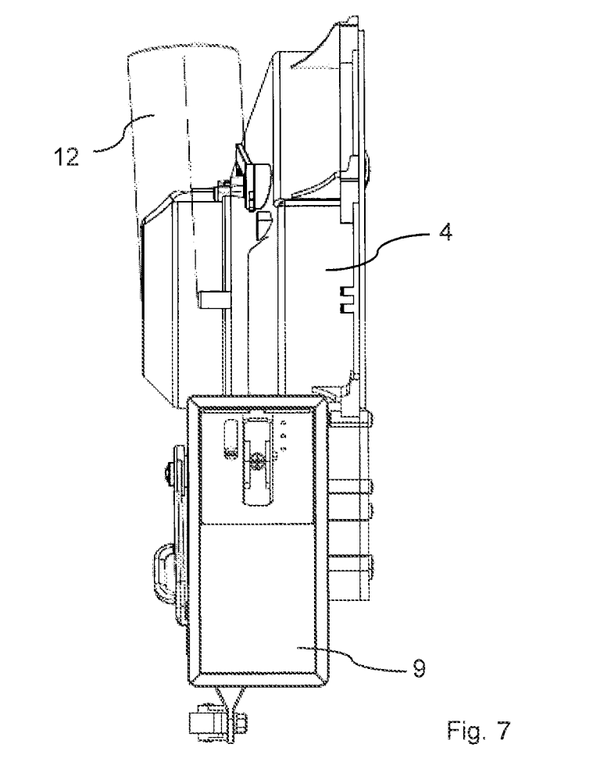
FIG. 7 is a schematic illustration of the housing cover from FIG. 5 from above.
Figure 8:
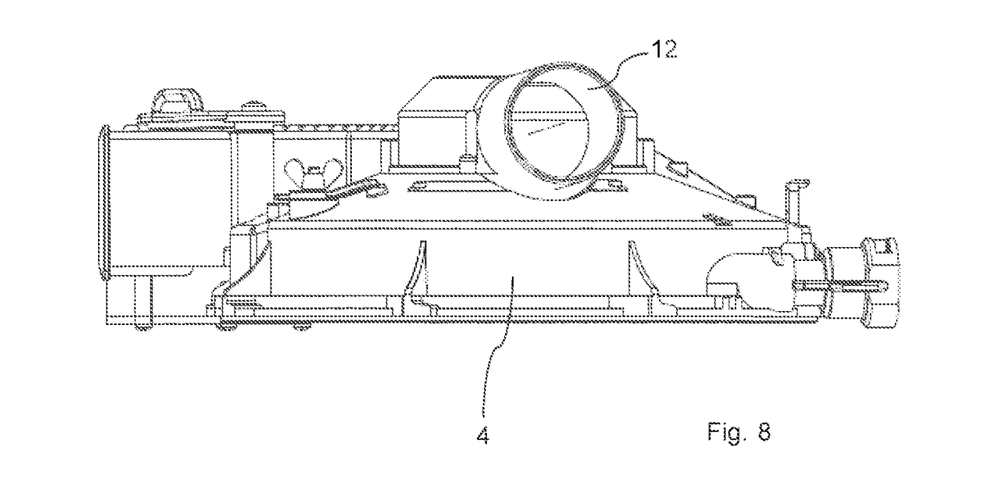
FIG. 8 is a schematic illustration of the housing cover from FIG. 5 from the side.
Figure 9:
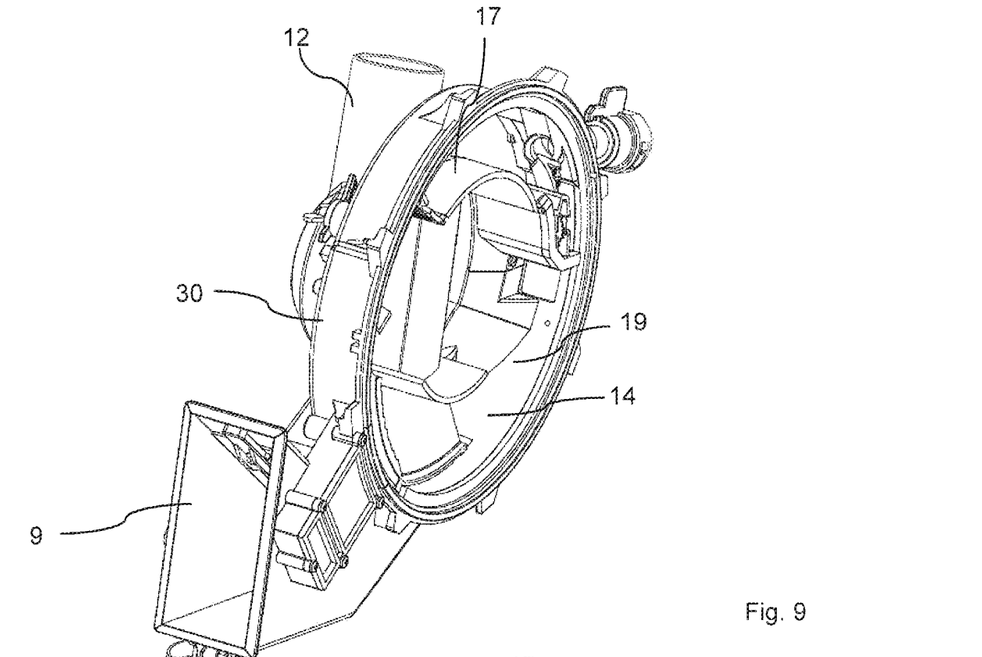
FIG. 9 is a schematic perspective illustration of a further housing cover.

In FIGS. 5 and 6, a scraper 23 is detachably arranged on the grain transfer device 10 and assists the release of the separated-out grains from the seeding disk.

A serrated separator 24 is also arranged in the housing interior 14 of the housing cover 4, for example integrally with the housing cover 4. In an alternative embodiment, the serrated separator 24 can be designed to be adjustable relative to the housing cover 4.

The housing 2 of the separating device 1 is designed for operation with a positive pressure between approximately 50 and approximately 75 mbar, alternatively with a positive pressure of approximately 60 to approximately 65 mbar. For example, a circumferential sealing device is configured for such positive pressures in the housing 2.

A passage 25 is formed in the inner wall portion 17, which passage connects the grain transfer chamber 16 to the feed for the gaseous fluid, such that in operation, by means of supplying the gaseous fluid through the passage 25 in the opening 18 via which the grain transfer chamber 16 and the grain sump 19 are connected, a counterflow can be formed which counteracts the passage of grains from the grain sump 19 into the grain transfer chamber 16 through the opening 18. This prevents grains from the grain sump 19 inadvertently entering the grain transfer chamber 16 during operation and thus possibly hindering the discharge of the separated-out grains. The passage 25 is formed, for example, as a lateral recess on the inner wall portion 17, such that the passage 25 is bounded by the inner wall portion 17 and the housing cover 4. Alternatively, the passage 25 can be enclosed all around by portions of the inner wall portion 17. An arrangement of several passages can be provided.

FIGS. 9 to 12 show a further housing cover 30. For the same features, the same reference numerals are used in FIGS. 9 to 12 as in FIGS. 1 to 8. The further housing cover 30 is partially modified compared to the housing cover 4 in order to make an adjustment for other grains. For example, the housing cover 4 from FIGS. 5 to 8 can configured for dispensing corn kernels, whereas the further housing cover 30 in FIGS. 9 to 12 is used for dispensing rapeseed grains.

For dispensing rapeseed grains, a preferably exchangeable grain receptable 42 is inserted into the further housing cover 30. This grain receptable 42 has a circular cross-section with an inner diameter of approximately 15 mm for the passage of the rapeseed grains. For sowing corn kernels, on the other hand, a grain receptable having an inner diameter of approximately 18 mm is preferably used. For the change from rapeseed to corn kernels, the grain receptable in the housing cover 4 can be exchanged accordingly.

Figure 10:
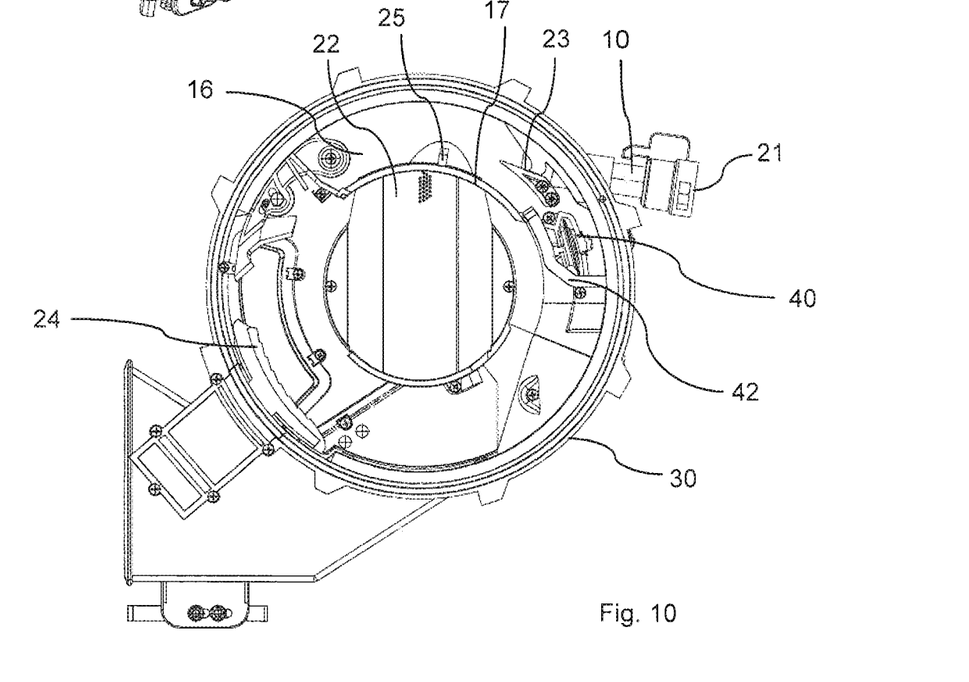
FIG. 10 is a schematic illustration of the housing cover from FIG. 9 from the front.
Figure 11:
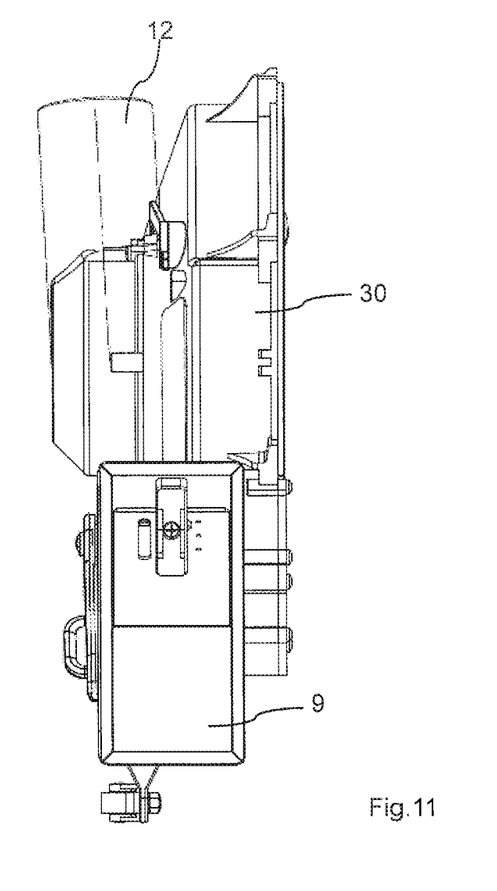
FIG. 11 is a schematic illustration of the housing cover from FIG. 9 from above.
Figure 12:
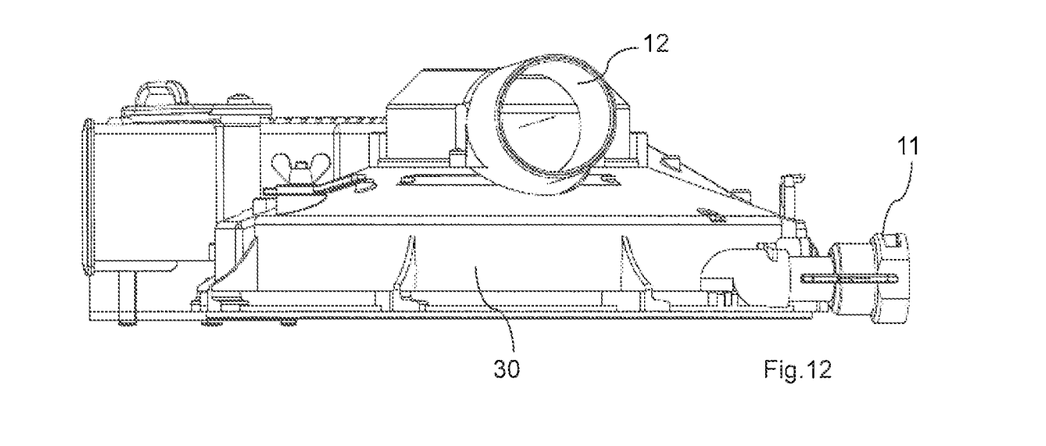
FIG. 12 is a schematic illustration of the housing cover from FIG. 9 from the side.

According to the embodiment shown in FIG. 10, a cleaning wheel 40 is optionally used for operation with rapeseed grains. The cleaning wheel 40 is rotatably mounted in the housing cover 30 and is preferably designed as a toothed wheel. The cleaning wheel 40 is arranged relative to a seeding disk (not shown) in such a way that each tooth of the cleaning wheel 40 meshes with a corresponding opening in the seeding disk.

For dispensing rapeseed grains, additional structural elements can be provided in the further housing cover 30, in order to, for example in cooperation with the grain feed 9, specifically control and thus optimize the feed of the rapeseed grains in the direction of the grain sump 19, since rapeseed grains, compared to corn kernels for example, have a significantly higher flow behavior. Such structural elements can preferably be designed so as to be interchangeable.

For further seed grains, preferably exchangeable structural elements (not shown) can be provided in the further housing cover 30 and/or in the housing cover 4, in accordance with the grain characteristics. The grain characteristics can relate to the grain size, the grain properties with regard to the surface thereof, and/or the grain shape in general.

The features disclosed in the above description, the claims, and the drawings can significant both individually and in any combination for the realization of the different embodiments.

The invention claimed is:

1. An apparatus for separating out grains of seed or fertilizer, having a separating device that operates according to the positive-pressure principle, the separating device comprising:
    a housing, having a housing base to be mounted on a frame or on a seeding row of an agricultural machine, and having a housing cover which is detachably arranged on the housing base for opening and closing a housing interior;
    a grain sump which is configured to receive grains of seed or fertilizer which are introduced into the housing interior and which are to be separated out;
    a separating disk which is rotatably mounted in the housing interior and has an arrangement of openings;
    a positive-pressure region which can be formed, during operation, in the housing cover on a front side of the separating disk such that a flow can be formed from the positive-pressure region toward the rear side of the separating disk through the openings, and separated-out grains can thus be localized in the region of the openings or adjacent thereto;
    a grain transfer device which is formed having a feed, a wall feedthrough, and an outlet on the housing cover, wherein the separated-out grains, after release from the separating disk, are introduced through the feed in the wall feedthrough and can be conveyed through said feed out of the housing interior via the outlet;
    a grain receptacle arranged in the region of the feed, which grain receptacle defines a feed opening connected to the wall feedthrough for a grain inlet and is detachably arranged on the inside of the housing cover; and
    a grain scraper arranged in the region of the feed of the grain transfer device, wherein the grain scraper is detachably arranged on the grain receptacle and configured to assist the release of the separated-out grains from the separating disk.

2. The apparatus according to claim 1, characterized in that the grain transfer device is integrally molded on the housing cover.

3. The apparatus according to claim 1, comprising a coupling device arranged at the outlet of the grain transfer device, which coupling device is configured to detachably couple a grain guide tube.

4. The apparatus according to claim 3, characterized in that the coupling device is formed on a coupling component inserted through the outlet in the wall feedthrough.

5. The apparatus according to claim 3, characterized in that the grain guide tube is detachably arranged on a support component.

6. The apparatus according to claim 3, characterized in that the grain guide tube has a substantially round tube cross-section in a tube portion that is proximal with respect to the grain transfer device and a substantially oval tube cross-section in a tube portion that is distal with respect to the grain transfer device.

7. The apparatus according to claim 1, comprising an inner wall portion arranged in the housing interior in the housing cover, which inner wall portion shields a grain transfer chamber upstream of the grain transfer device from the rest of the housing interior in the housing cover, the inner wall portion having a passage which is connected to a fluid feed of the housing such that a counterflow can be formed during operation by feeding a gaseous fluid through the passage in an opening via which the grain transfer space and the grain sump are connected, said counterflow counteracting the passage of grains out of the grain sump into the grain transfer chamber through the opening.

8. The apparatus according to claim 1, characterized in that the separating disk is arranged in the housing cover in a rotatably mounted plate.

9. A seed meter comprising an apparatus according to claim 1.

10. A seeding row comprising an apparatus according claim 1.

11. A method for separating out grains of seed or fertilizer by means of a separating device that operates according to the positive-pressure principle, wherein in the method:
a housing is provided which has a housing base to be mounted on a frame or on a seeding row of an agricultural machine, and has a housing cover which is detachably arranged on the housing base for opening and closing a housing interior;
a grain sump receives grains of seed or fertilizer which are introduced into the housing interior and which are to be separated out;
a separating disk which is arranged in the housing interior and has an arrangement of openings is rotated;
a positive-pressure region is formed in the housing cover on a front side of the rotating separating disk such that a flow is formed from the positive-pressure region toward the rear side of the separating disk through the openings, and separated-out grains are thus localized in the region of the openings or adjacent thereto; and
the separated-out grains reach a grain transfer device after release from the separating disk, wherein the grain transfer device has a feed, a wall feedthrough, and an outlet on the housing cover, such that the separated-out grains, after release from the separating disk, can be introduced through the feed in the wall feedthrough and are conveyed through said feed out of the housing interior via the outlet,
wherein a grain receptacle is arranged in the region of the feed that defines a feed opening connected to the wall feedthrough for a grain inlet and is detachably arranged on the inside of the housing cover, and
wherein a grain scraper is arranged in the region of the feed of the grain transfer device, wherein the grain scraper is detachably arranged on the grain receptacle and configured to assist the release of the separated-out grains from the separating disk.

12. The method according to claim 11, characterized in that the positive-pressure region in the housing interior is formed with a positive pressure of at least approximately 60 mbar.

* * * * *